(12) United States Patent
Laudenbach et al.

(10) Patent No.: US 7,021,692 B2
(45) Date of Patent: Apr. 4, 2006

(54) LOCKING DEVICE FOR A MOTOR VEHICLE

(75) Inventors: Thomas Laudenbach, Rottenburg (DE); Mathias Kötter, Ostfildern (DE)

(73) Assignee: BOS GmbH & Co. KG, Ostfildern (DE)

( * ) Notice: Subject to any disclaimer, the term of this patent is extended or adjusted under 35 U.S.C. 154(b) by 52 days.

(21) Appl. No.: 10/606,536

(22) Filed: Jun. 26, 2003

(65) Prior Publication Data

US 2004/0000797 A1    Jan. 1, 2004

(30) Foreign Application Priority Data

Jun. 27, 2002    (DE)    ................. 102 29 675

(51) Int. Cl.
    *B60R 27/00*    (2006.01)
(52) U.S. Cl. ..................... 296/76; 296/57.16
(58) Field of Classification Search .............. 296/76, 296/37.8, 37.16, 98
    See application file for complete search history.

(56) References Cited

U.S. PATENT DOCUMENTS

| | | | |
|---|---|---|---|
| 6,003,920 A | 12/1999 | Crisp | |
| 6,030,019 A * | 2/2000 | Stiltner et al. | 296/57.1 |
| 6,290,281 B1 * | 9/2001 | Durrani et al. | 296/121 |
| 6,349,986 B1 | 2/2002 | Seel et al. | |
| 6,402,217 B1 * | 6/2002 | Ament et al. | 296/37.16 |
| 6,439,623 B1 * | 8/2002 | Lohfeld et al. | 292/201 |

FOREIGN PATENT DOCUMENTS

| | | |
|---|---|---|
| DE | 197 22 501 | 12/1997 |
| DE | 100 38 842 | 2/2002 |

* cited by examiner

*Primary Examiner*—H. Gutman
(74) *Attorney, Agent, or Firm*—Flynn, Thiel, Boutell & Tanis, P.C.

(57) ABSTRACT

A locking device with a holding device for a cover of a motor vehicle trunk is movable in a longitudinal guide and can be held in form-closed manner there by a movable projection. The projection is movable by an operating device and is rotatable about a fulcrum. The operating device includes an electromotive drive and a gear, which can be a non-self-locking gear.

23 Claims, 3 Drawing Sheets

LOCKING DEVICE FOR A MOTOR VEHICLE

FIELD OF THE INVENTION

The invention relates to a locking device for a motor vehicle, in which a projection acts on a holding part and the projection and holding part are movable relative to one another. In the sense of the present invention, a locking device is also understood to mean an unlocking device.

BACKGROUND OF THE INVENTION

Locking devices are e.g. known in the form of door looking systems for motor vehicles having a central locking system. Under the action of compressed air, a projection enters a recess of a holding part. This generally involves the insertion of a pin in a recess.

SUMMARY OF THE INVENTION

The object of the invention is to provide a locking device permitting the automatic or simplified freeing or release of a holding part.

This object is achieved by a locking device including advantageous and preferred developments of the invention described in detail hereinafter.

According to the invention a projection acts on a holding part, and more particularly this takes place in a form-closed manner as an end rod cannot be moved along the direction of a guide due to the projection. The projection and the holding part are moved relative to one another in order to release the connection or engagement. Operating means are provided which move the projection and holding part relative to one another in order to release the engagement. These operating means have an electromotive drive and a gear for transforming the drive movement. Thus, as a function of the operating means, the cover can be freed or released electrically and in a quasi-remotely controlled or automated manner.

The advantage of an electromotive drive compared with lifting or operating magnets known for similar objects or purposes is that in the case of lifting magnets larger operating paths are difficult to achieve and also magnets are relatively heavy.

On the holding part can be provided a recess into which the projection is inserted or on which it acts. The recess can be a cutout open on one side, or alternatively a depression or breakthrough in the manner of an opening. The projection can e.g. pass into an opening in the manner of a pin.

The drive can e.g. be constructed as a self-locking gear. This permits a type of automatic resetting, if this is desired. In one construction possibility for the gear, it can be provided with non-axially parallel toothed wheels or pinions. It can be a worm gear, advantageously a multiple worm gear. The latter can also be a non-self-locking gear.

As a further possibility, use can be made of a gear with a rack. The rack advantageously is connected to or moves the projection or holding part.

The projection or the holding part can have both a form-closed holding position and also a release position for release purposes. This more particularly applies for the projection. An engagement advantageously occurs in at least one direction. In the other direction the holding part can optionally be moved freely away from the projection. There can alternatively be an engagement in both directions.

It is possible to provide a freedom of movement of the projection and the holding part relative to one another in two opposing directions. In one direction, preferably for releasing the engagement, the movement can take place electromotively with the aid of operating means. Advantageously for the purpose of resetting the projection or restoring the engagement, a movement in the other direction can take place by a mechanical resetting, particularly with a spring or the like.

Advantageously the projection is moved relative to the holding part, i.e. the projection itself moves. If the projection is constructed in a movable manner, it can be in the form of a linearly operated rod or the like, which is inserted in the manner of a pin in an opening on the holding part.

It is alternatively possible to construct the projection so as to rotate about a rotation axis. It is possible here to construct the projection so as to give way in one direction for securing the holding part. This means that by pressing the holding part against the projection, which can be simplified by a lateral bevel, the projection gives way and retains the holding part behind it. Thus, in practice the holding part can be firmly hooked behind the projection. It is also possible for the projection to release a guide, e.g. a longitudinal guide for the holding part.

In a simplified development of the invention, it is possible to design the operating means in a positionally secured manner and the projection in a movable manner. Alternatively, the operating means can be constructed movably together with the projection. For example, an electromotive drive can rotate with the gear about a toothed wheel or the like, which is fixed in position. A projection can be connected to the drive and rotates in this way.

In order to transfer the release force of the operating means to the holding part or projection, an actuating rod can be provided. The latter is movable and is e.g. in operative connection with the projection in such a way that the latter rotates or gives way through a longitudinal connection of the actuating rod.

The operating means can be connected to a release device, e.g. to a sensor or switch. The release device can e.g. be located on a closure, a door or a tailgate of the boot or trunk and release the operating means. Thus, e.g. on opening the tailgate, there can be an automatic release and retraction of the projection and consequently a trunk cover or the like.

With particular advantage such a locking device is used for a cover of a motor vehicle trunk. The cover can have a holding part and can be form-closed held in a holding position by the projection.

It is possible for the cover to be freely movable. It advantageously runs with a holding part in a guide. The guide can in particular be provided on both sides of the trunk. For this purpose the cover can be provided with holding ends or an aforementioned terminating rod, which is guided in the guide. The projection advantageously engages in the guide. Here it is particularly advantageous if the projection is movable. For producing the engagement, it can engage for this purpose in the guide. For releasing the cover, the projection can be moved out of the guide.

In the holding position the cover is advantageously under a force action, e.g. a tension. If now the holder is released or the engagement between the cover and projection is freed, the cover can move automatically. Such an automatic movement advantageously either takes place into another position or it is essentially a retraction of the cover for stowing.

In addition to the engagement between cover and projection in one direction, the projection form-closed holds the cover in two directions along the guide. Thus, a movement of the cover overall can be avoided by the projection.

A guide can be in particular provided on the rearmost roof support column of the motor vehicle. As a result, on opening a tailgate, the cover can be moved upwards therewith, so as to simultaneously free the trunk. However, this still does not release the cover in such a way that it can completely contract.

The cover can be constructed as a flat article and have a substantially rigid rod at the end. The rigid rod can substantially cover the entire width of the trunk, as well as the cover. On the rigid rod are e.g. provided the holding ends corresponding to the holding part.

These and further features can be gathered from the claims, description and drawings. The individual features, both individually and in the form of subcombinations, can be implemented in an embodiment of the invention and other fields and represent advantageous, independently protectable constructions for which protection is claimed here. The subdivision of the application into individual sections and the subheadings in no way restricts the general validity of the statements made thereunder.

DETAILED DESCRIPTION OF THE EMBODIMENTS

Figure 1:
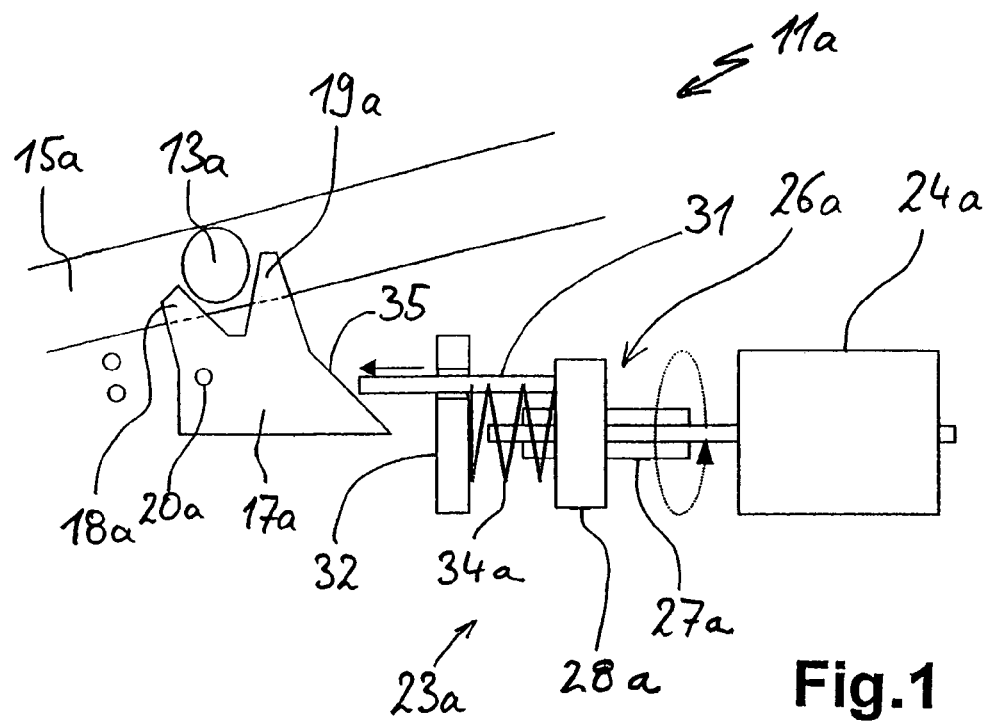
FIG. 1 is a view of an end rod in a guide, which is held by a projection movable by the operating means.

FIG. 1, which like the remaining drawings is to be understood diagrammatically and which shows the principle of the invention, reveals a holding device 11a for an end rod 13a of a cover 12. The holding device 11a essentially comprises a locking device according to the invention.

The end rod 13a is movable in a longitudinal guide 15a and can in particular be moved backwards and forwards. It can be held in the holding position shown in FIG. 1 by a projection 17a and movement thereof is prevented. For this purpose, the projection 17a has a left-hand prong 18a and a right-hand prong 19a. Between the two prongs 18a and 19a is held the end rod 13a, which is prevented from moving in both directions along the longitudinal guide 15a. The projection 17a is rotatable about the fulcrum 20a.

As can be seen, through the slight bevel of the left-hand prong 18a to the upper left, during a movement of the end rod 13a from the left, the projection 17a is constructed movably so as to give way. Thus, through manual movement, the end rod 13a can be held on the projection 17a or introduced between the prongs 18a and 19a.

FIG. 1 also shows that operating means 23a are provided for moving the projection 17a. The operating means 23a has an electric drive motor 24a and a gear 26a. The gear 26a comprises a worm wheel 27a on the motor axis. It engages in a counterwheel or counterpart 28a, which performs a translatory movement. The counterpart 28a is connected to a release rod 31 guided in a guide 32.

Through the longitudinal movement of the counterpart 28a, the release rod 31 is movable against the sliding edge 35 of the projection 17a, so that it can pivot the projection 17a clockwise for releasing the end rod 13a.

There is also a return spring 34a for the counterpart 28a or release rod 31. In this case, the return spring 34a is positioned between the guide 32 and the counterpart 28a. If the drive motor 24a is no longer rotating or is exerting no force, the return spring 34a forces the counterpart 28a to the right again. As the gear 26a does not have a self-locking construction, the worm wheel 27a and the drive shaft of the drive motor 24a rotate and the counterpart 28a gives way to the right. Thus, the release rod 31 also moves to the right and the projection 17a is again free. It is also possible to return the projection 17a to the position shown in FIG. 1 by another spring.

FIG. 1 makes it clear to the expert how in a modified form constituted solely by the operating means 23a and the release rod as the projection according to the invention and the guide 32 as the holding part with a recess through which the release rod moves, it is possible to construct a locking device according to the invention in its simplest form. It would also be possible to move the release rod 31 to the right out of the guide 32, so that the guide 32 would be released. Thus, unlocking would take place and the guide 32 would be freely movable.

Alternatively the gear 26a could be replaced by a toothed wheel or pinion as the power take-off on the electric motor 24a and a rack cooperating with said pinion. The rack drives a projection similar to the projection 17a in FIG. 1. A spring is also provided for resetting purposes.

Figure 2:
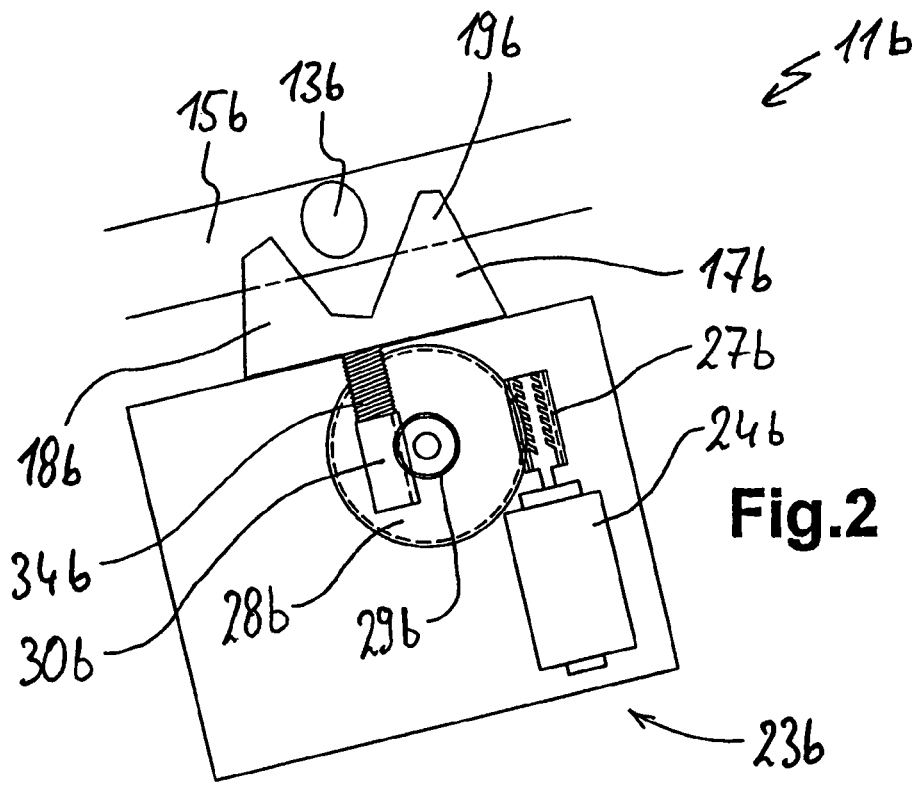
FIG. 2 is a variant of the view of FIG. 1 with a longitudinally movable projection.

The simplified view of FIG. 2 shows, how a similarly constructed projection 17b with a left-hand prong 18b and a right-hand prong 19b is linearly displaceable instead of being constructed in such a way as to rotate about a fulcrum 20a in accordance with FIG. 1. The linear displaceability is provided by the operating means 23b. The embodiment of FIG. 2 can be easily implemented in a modification of the operating means 23a of FIG. 1 or 23d of FIG. 4.

In FIG. 2, the operating means 23b is constructed in such a way that the drive motor 24b rotates a worm wheel 27b. The worm wheel 27b is in engagement with a large counterwheel 28b, which is in turn connected to a small toothed wheel 29b. The small toothed wheel 29b engages in a rack 30b, which is so connected to the projection 17b that it draws the latter with it during a movement to the left or right.

In FIG. 2, a return spring 34b is provided that allows an elastic inward movement of the projection 17b, even in the case of a stationary rack 30b. This can e.g. be provided for forcing an end rod 13b into a cavity between the prongs 18b, 19b and automatically extending the projection 17b again for retaining the end rod 13b. The insertion and removal of the projection 17b by means of the operating means 23b for releasing the end rod 13b could in this case take place by the operating means 23b or the drive motor 24b respectively. As can be gathered from FIG. 2, a gear comprises the worm wheel 27b, the two toothed wheels 28b, 29b and the rack 30b. On introducing the end rod 13b into the longitudinal guide 15b, e.g. from the left over the bevelled left-hand prong 18b, the projection 17b is forced back again. It once again encloses the end rod 13b between the two prongs 18b and 19b and in this way secures the rod.

Figure 3:
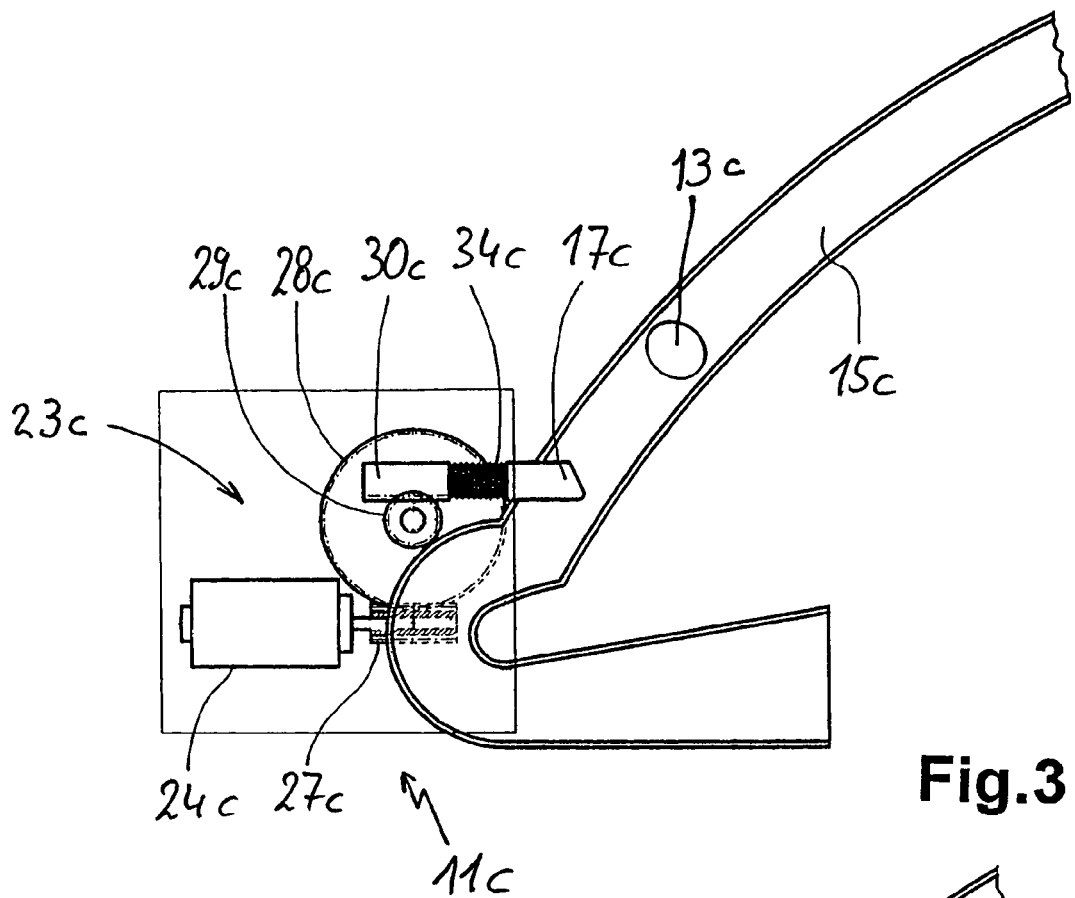
FIG. 3 is a detailed representation of a guide with a projection movable by operating means and in which the projection is longitudinally movable.

FIG. 3 shows holding device 11c and a bent or curved guide 15c in place of straight longitudinal guides according to FIGS. 1 and 2. In a corresponding manner, an end rod 13c can be displaced or moved within the same.

In accordance with the operating principle of FIG. 2, the projection 17c is movable in a translatory manner. It in particular has a bevel pointing to the top right for the automatic locking of the end rod 13c from above in the guide 15c.

The operating means 23c are constructed in such a way that the drive motor 24c rotates a worm wheel 27c. The worm wheel 27c is in engagement with the large counterwheel 28c, which is in turn connected to a small toothed wheel 29c. The small toothed wheel 29c engages in the rack 30c, which is so connected to the projection 17c that it draws the latter with it during a movement to the left or right.

Here a return spring 34c is provided, which can allow an elastic movement to the left of the projection 17c, even in the case of a stationary rack 30c. This can e.g. be provided for forcing an end rod 13c behind the projection 17c and in order to automatically extend it again for retaining the end rod 13c. The insertion and removal of the projection 17c by means of the operating means 23c for releasing the end rod 13c could in this case take place by the operating means 23c or the drive motor 24c respectively.

As can be gathered from FIG. 3, a gear comprises the worm wheel 27c, the two toothed wheels 28c, 29c and the rack 30c.

Figure 5:
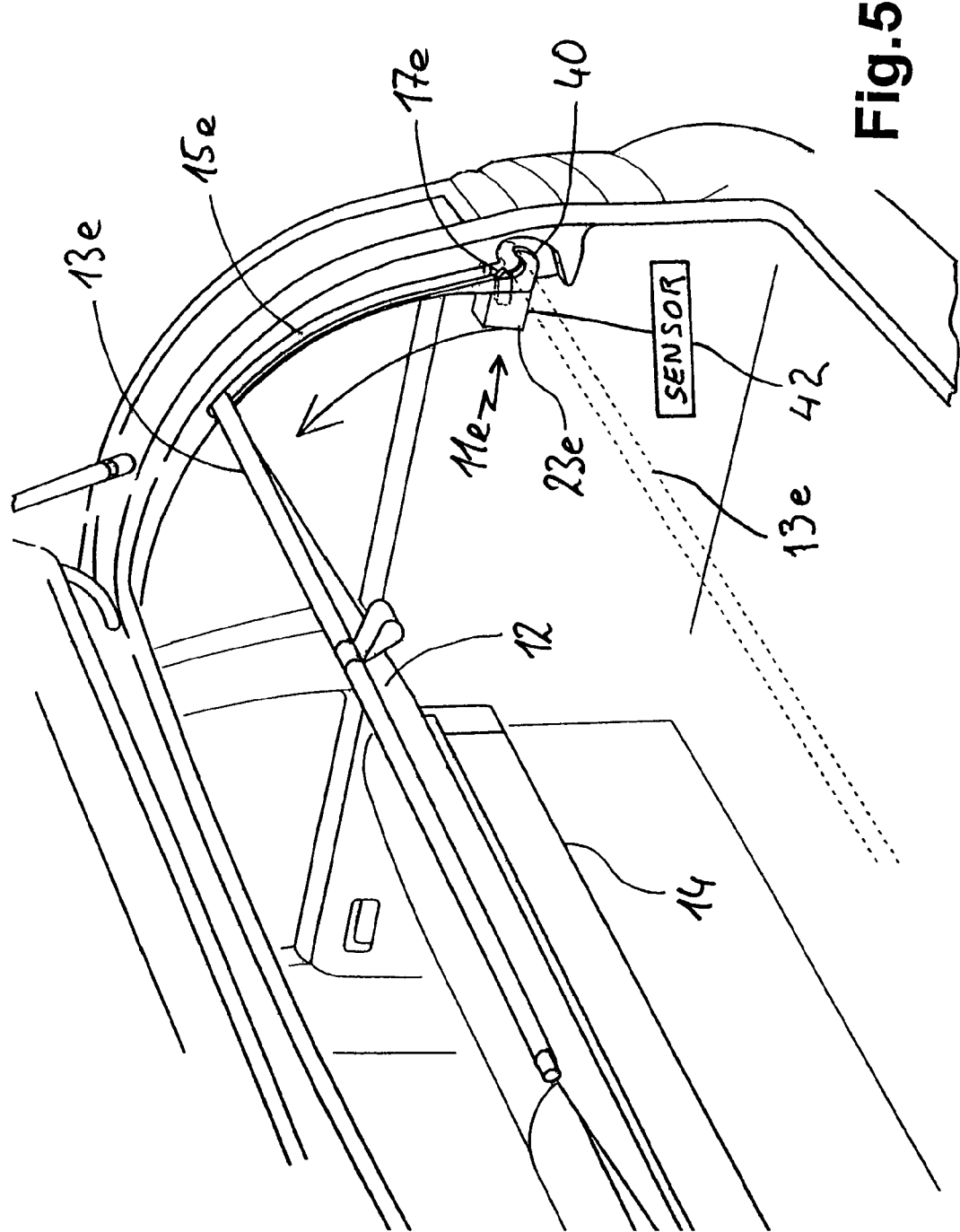
FIG. 5 is an oblique view of a car trunk with a cover movable in a guide and which can be secured and released by a projection together with operating means.

The guide 15c can pass further upwards, much like the guide 15a of FIG. 5. In the downwards direction it can be opened in the right-pointing end for introducing the end rod 13c of the cover 12.

Figure 4:
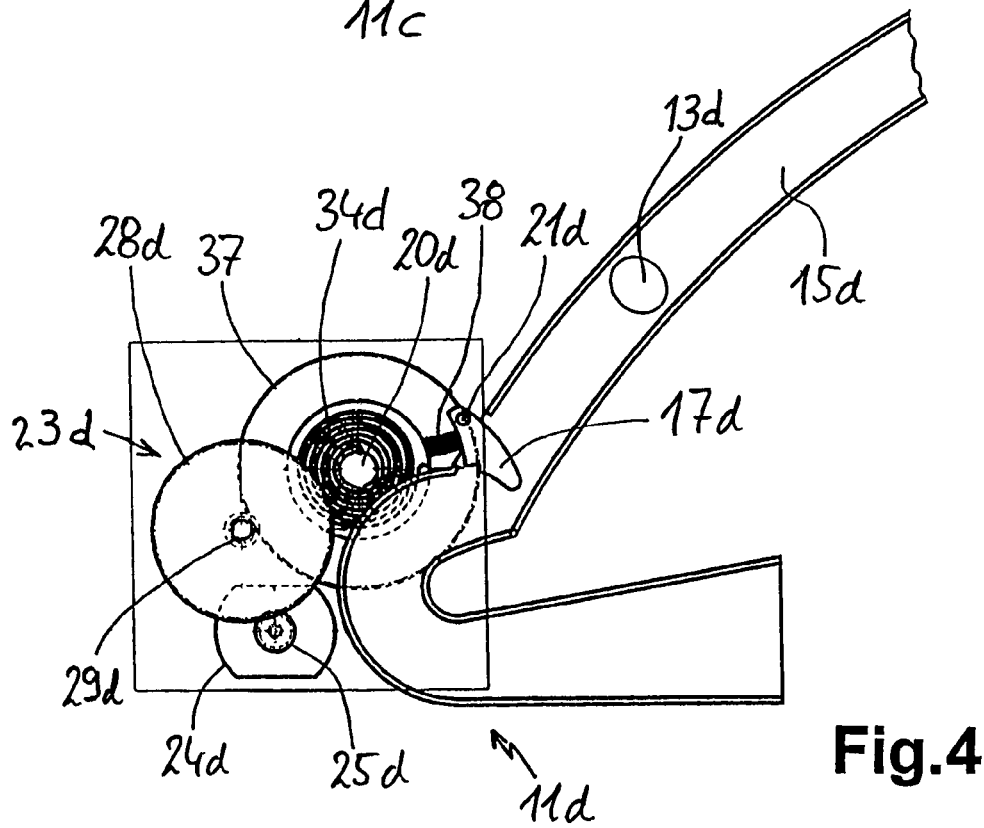
FIG. 4 is a variant of the device of FIG. 3 with a different construction of the operating means, as well as a projection twice pivotable on a toothed wheel.

In FIG. 4 the guide 15d has the same construction as in FIG. 3. However, the operating means 23d of the holding device 11d exclusively has toothed wheels and no worm wheels. The drive motor 24d carries a motor pinion 25d, which drives a large counterwheel 28d. The counterwheel 28d is connected to a small toothed wheel 29d, which in turn drives the large toothed wheel 37. On the right hand side, the projection 17d is fixed to the toothed wheel 37 by means of a second fulcrum 21d on which the projection 17d is mounted in a rotary manner.

In the case of a movement from above of an end rod 13d against the projection 17d, the latter can rotate about the second fulcrum 21d and can pivot counter to the resistance of the second spring 38 and can free the guide for the end rod. Forced out by the second spring 38, the projection 17d automatically snaps out again behind the end rod 13.

For releasing the end rod 13d in the upwardly, right-sloping direction, by means of the drive motor 24d the large toothed wheel 37 is rotated counterclockwise about the fulcrum 20d. Therefore the projection 17d disappears from the guide 15d and frees the end rod 13d. The rotary movement of the large toothed wheel 37 can tension a return spring 34d, here constructed as a spiral spring. After switching off the drive motor 24d, through the tension of the return spring 34d the large toothed wheel 37 is again rotated counterclockwise. This advantageously takes place against a stop to such an extent that the projection 17d is in the position shown in FIG. 4.

It is stated overall in connection with FIGS. 1, 3 and 4 that through the choice of the transmission ratios of gears, the operating force and speed of the projections 17a to 17d is determined. Advantageously all the gears are not self-locking, so that they are able to move under the action of the return spring 34a–34d.

FIG. 5 is a view from the rear of a car trunk that shows the construction of the cover 12 with end rod 13e. The cover 12 can be drawn into the roller box 14, e.g. by a restoring spring. In this way the cover 12, and in particular the end rod 13e is constantly force-loaded towards the roller box 14.

The end rod 13e runs in the longitudinal guide 15e, whose configuration roughly corresponds to that of the tail column. A holding device 11e is provided in the lower region of the longitudinal guide 15e and is provided with a projection 17e, which extends into the longitudinal guide 15e and in the position shown in dashed line form prevents the end rod 13e from moving upwards in the longitudinal guide 15e. The projection 17e is movable by means of operating means 23e, more particularly extractable from the longitudinal guide 15e.

By means of a holding offset 40 belonging to the longitudinal guide 15e, the end rod 13e is supported downwards in the position shown in dashed line form. If it is drawn upwards and rearwards, it is possible to overcome the holding offset 40 and the end rod 13e can be removed in downwardly and forwardly sloping manner out of the longitudinal guide 15e and can e.g. be completely countersunk into the roller box 14.

After moving back the projection 17e, the end rod 13e moves out of the dashed line position into the continuous line position. This movement takes place through the tension to which the cover 12 is exposed. During a movement along the longitudinal guide 15e in the forwards and upwards direction, the end rod 13e comes closer to the roller box 14. Thus, the tensioned cover can be moved by tension in guide 15e.

In an arrangement according to FIG. 5, a sensor 42 or a switch can be provided for recording an opening of the tailgate. As a function thereof a signal is emitted to the operating means 23e for retracting the projection 17e and bringing about a movement of the cover 12. This can e.g. serve to automatically move the cover on opening the tailgate in such a way that the trunk is at least rendered partly freely accessible. In place of an upward movement, it is also conceivable to provide a longitudinal guide directly towards the roller box. Then on releasing the end rod 13e through projection 17e, the cover can be completely and automatically drawn into the roller box 14. On closing the tailgate, the cover is then manually secured behind the projection 17e, if this is desired.

The invention claimed is:

1. Locking device for a motor vehicle, said locking device comprising:
   a projection having a freedom of relative movement in a first direction and in a second opposite direction;
   a holding part to be locked by said projection, said projection and said holding part being movable relative to one another;
   a spring for maintaining the projection in a holding position to provide a holding action by applying a biasing force in the first direction; and
   an operating device co-acting with said projection, said operating device including an electromotive drive with a gear for providing relative movement of said projection from the holding position of said holding part in the second direction to a release position for releasing said holding part,
   wherein in the second direction for releasing said holding action, the movement takes place electromotively through said operating device and in the first direction said movement takes place by the force of said spring.

2. Locking device according to claim 1, wherein said gear has toothed wheels, wherein said wheels are not axially parallel.

3. Locking device according to claim 1, wherein said gear comprises a worm gear.

4. Locking device according to claim 1 for a cover of a vehicle trunk, wherein said trunk has a tailgate.

5. Locking device according to claim 4, wherein a sensor senses opening of the tailgate to provide a signal to the operating device.

6. Locking device according to claim 1 for a cover of a motor vehicle trunk, wherein said cover comprises said holding part and is held closed in a holding position by said projection.

7. Locking device according to claim 6, wherein said cover with said holding part moves in a guide and engages said projection in said guide.

8. Locking device according to claim 7, wherein said projection is movable for bringing about engagement and for releasing said guide.

9. Locking device according to claim 6, wherein said cover is under the action of a tension, said cover automatically being retracted on being released from said projection.

10. Locking device according to claim 6, wherein said projection holds said cover in both said directions along said guide and prevents a movement of the cover.

11. Locking device according to claim 6, wherein said trunk has a lateral boundary and said guide runs in upwardly sloping manner thereon.

12. Locking device according to claim 11, wherein said guide is located on the rearmost roof support column of the motor vehicle and runs in the direction of the roof.

13. Locking device according to claim 6, wherein said cover is a flat article and has a rod at one of its ends, said rod essentially covering said entire trunk width.

14. Locking device according to claim 13, wherein said ends of said rod form said holding parts and are retained by said projection.

15. Locking device arrangement for locking and unlocking of an end rod that is movable along a guide so that a cover secured to the end rod is capable of closing a recess in a rear part of a motor vehicle, said locking device arrangement comprising:
   a projection for locking the end rod, said projection being movable in a first direction and in a second direction, said projection and the end rod being movable relative to one another;
   a spring for maintaining the projection in a holding position by applying a biasing force in the first direction; and
   an operating device co-acting with said projection, said operating device including an electromotive drive with a gear arrangement for generating movement of said projection in the second direction to a release position away from the holding position, that releases the end rod for movement along the guide,
   wherein movement in the second direction takes place electromotively through said operating device and movement in the first direction takes place by the force of said spring.

16. The locking device arrangement according to claim 15, wherein said gear arrangement comprises a worm wheel connected to a drive shaft of said electromotive drive, said worm wheel rotatably driving an adjacent counter wheel.

17. The locking arrangement according to claim 16, wherein said gear arrangement comprises a toothed wheel connected to said counter wheel and a rack capable of linear motion in response to rotation of said toothed wheel.

18. The locking arrangement according to claim 17, wherein said spring is oriented at one end against an end of said rack.

19. The locking arrangement according to claim 15, wherein said gear arrangement comprises a toothed wheel and a rack capable of linear motion in response to rotation of said toothed wheel.

20. The locking arrangement according to claim 19, wherein said spring is oriented at one end against an end of said rack.

21. The locking arrangement according to claim 15, wherein said spring comprises a spiral spring.

22. The locking arrangement according to claim 15, wherein said projection comprises a first prong and a second prong defining a cavity therebetween to receive the end rod.

23. Locking device arrangement for locking and unlocking of an end rod that is movable along a guide so that a cover secured to the end rod is capable of closing a recess in a rear part of a motor vehicle, said locking device arrangement comprising:
   a projection for locking the end rod, said projection being movable in a first linear direction and in a second opposite direction, said projection and the end rod being movable relative to one another;
   a spring for maintaining the projection in a holding position for holding the end rod by applying a biasing force in the first direction; and
   an operating device co-acting with said projection, said operating device including an electromotive drive with a gear arrangement for generating movement of said projection in the second direction to a release position away from the holding position, that releases the end rod for movement along the guide, said gear arrangement including a toothed wheel and a rack capable of linear motion in response to rotation of said toothed wheel,
   wherein movement in the second direction takes place electromotively through said operating device and movement in the first direction takes place by the force of said spring.

* * * * *